United States Patent [19]

Sandelman

[11] 4,234,869
[45] Nov. 18, 1980

[54] MERCHANDISE DISPLAY AND CATEGORICAL INDICATORS

[76] Inventor: Robert M. Sandelman, 11 E. 36th Street, New York, N.Y. 10016

[21] Appl. No.: 960,771

[22] Filed: Nov. 15, 1978

[51] Int. Cl.² .............................................. G08B 5/00
[52] U.S. Cl. ........................... 340/286 R; 340/286 M; 116/279; 40/573
[58] Field of Search ............ 340/286 M, 707, 166 R, 340/286 R; 40/573; 116/279

[56] References Cited

U.S. PATENT DOCUMENTS

| | | | |
|---|---|---|---|
| 1,219,230 | 3/1917 | Blackmore | 340/286 M |
| 2,159,925 | 5/1939 | Wood | 340/286 M |
| 2,204,315 | 6/1940 | Levin | 340/286 M |
| 2,455,210 | 11/1948 | Anderson | 340/286 M |
| 2,542,890 | 2/1951 | Basu | 340/154 X |
| 3,292,489 | 12/1966 | Johanson | 340/707 |
| 3,573,792 | 4/1971 | Reed | 340/286 M |

*Primary Examiner*—Harold I. Pitts
*Attorney, Agent, or Firm*—Auslander, Thomas & Morrison

[57] ABSTRACT

An indicator system for a merchandise display rack indicates a related article as a signal is energized indicating the position of the merchandise on the rack. The signal is timed. Other signals give different indications in the same way and cancel prior indications not appropriate to the current signals indicated.

8 Claims, 5 Drawing Figures

MERCHANDISE DISPLAY AND CATEGORICAL INDICATORS

BACKGROUND AND SUMMARY OF THE PRESENT INVENTION

The present invention teaches a categorical indicator device which, upon command of the user, indicates various ones of the total types of merchandise in a row and column display.

In one embodiment of the invention, a separate categorical indicator is applied to the front of a row and column display rack. When any one of the several controls are operated, an indicator device adjacent one or more of the products in the display rack is energized. For purposes of illustration, the display device is assumed to be an electric lamp which is illuminated when energized and which distinguishes the product associated therewith from other products not associated with an illuminated lamp. As one concrete example of a current embodiment, a spice rack is chosen for purposes of description. It would be clear to one skilled in the art that the invention is not limited to spice racks, but can encompass any kind of display device in which a plurality of products are displayed in a row by column display case. In addition, the teaching of illuminated light bulbs as indicators should not be taken as limiting the invention. Instead, other types of indicators, such as mechanical annunciators, acoustic devices such as buzzer or bell may be substituted for the lamps without departing from the spirit and scope of the present invention.

In a spice rack chosen for description, a number of command buttons are available to the user. When one of the command buttons is depressed, a plurality of indicators are illuminated to indicate the group of spices associated with the command button. As one example, which should not be considered limiting, a row of command buttons labelled with the names of countries, such as Italy, Germany, France, United States, Israel, Great Britain or Russia and Greece, may be available. Depressing one of these buttons, for example, Italy, illuminates all of the indicators adjacent to spices which are commonly used in Italian cooking. By pressing another button, such as France, illuminates a second subset of indicators adjacent spices commonly used in French cooking. A substantial overlap between the categories is unavoidable. Consequently, the apparatus must be capable of illuminating certain of the indicators from separate commands from two or more command buttons.

In a further development of the apparatus, the spices that are required in certain specific recipes may be indicated. For example, a command request for indication of the spices used in southern fried chicken, would illuminate the indicators adjacent to pepper, salt and paprika, whereas a command for chicken cacciatore would illuminate indicators for paprika, garlic powder, oregano, parsley flakes, bay leaf, salt and seasoned pepper.

In order to assist the purchaser in making a leisurely selection of the spices, a timer maintains the indicators illuminated for a fixed period of time after the command button is pressed. When a second command button is pressed before the end of the cycle of the preceding command button, the preceding cycle is immediately terminated and a new timing cycle is started for a newly selected group.

In one embodiment of the invention, a permanently wired memory, permanently relates specific command buttons to specific indicators in a display. In an alternative embodiment, a programmable digital computer, preferably a microprocessor, may be reprogrammed at the will of the user, to change the relationship between specific command requests and the subset of indicators energized. This is especially useful in merchandise displays which are subject to change from time to time. Such change may be reallocation of space and/or deletion or addition of displayed merchandise.

Although such novel feature or features believed to be characteristic of the invention are pointed out in the claims, the invention and the manner in which it may be carried out may be further understood by reference to the description following and the accompanying drawings.

DETAILED DESCRIPTION OF THE PREFERRED EMBODIMENTS

Referring now to the figures in greater detail, where like reference numbers denote like parts in the various figures.

Figure 1:
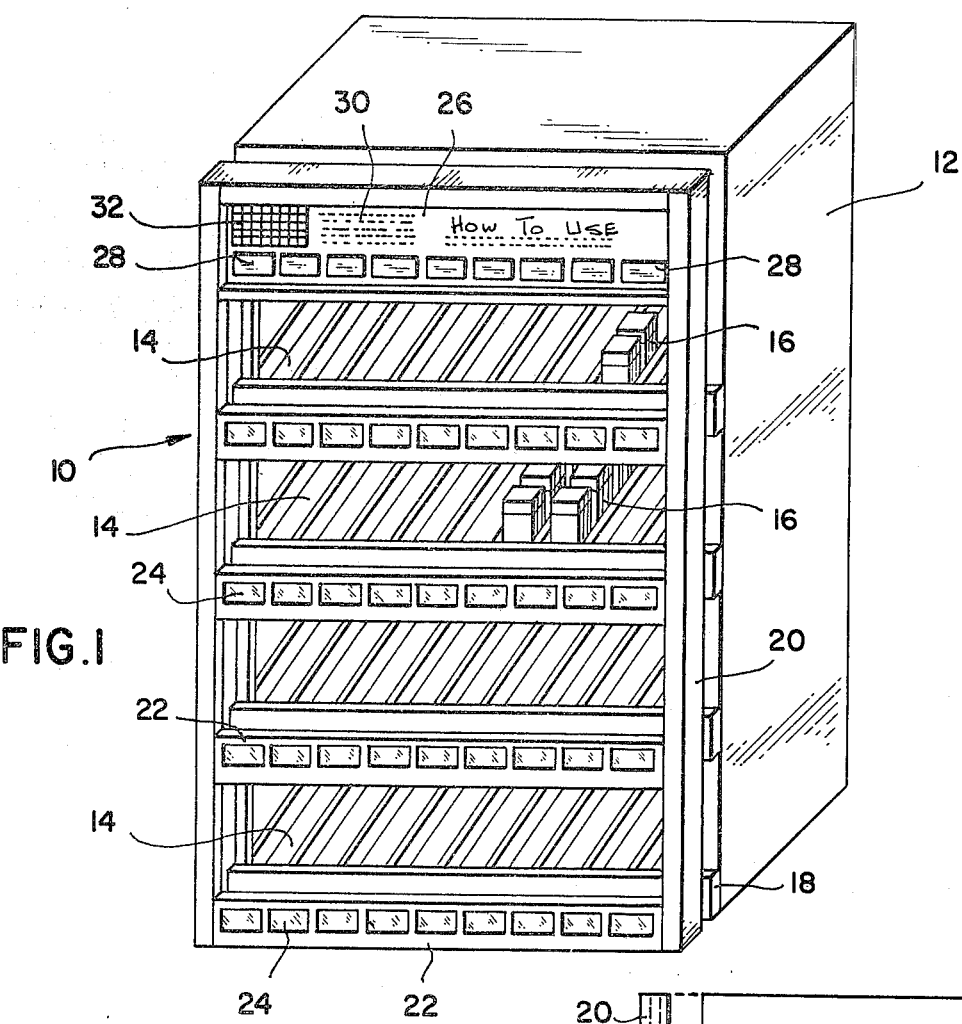
FIG. 1 shows a perspective view of one embodiment of the present invention.

Referring now to FIG. 1, there is shown generally at 10 a spice rack according to the present invention. A display case 12, having a plurality of shelves 14, has a plurality of product containers 16, arrayed in rows and columns.

Figure 2:
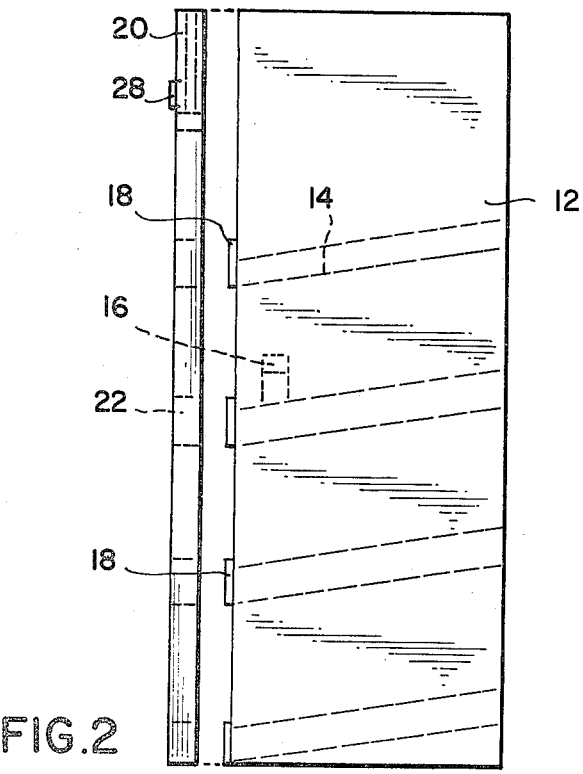
FIG. 2 shows a side view of the embodiment of FIG. 1.

Turning momentarily to FIG. 2, the shelves 14 are slanted downward and forward so that the product containers 16 are shifted toward the front by gravity. The product containers are stopped by stops 18.

A categorical display device 20 fits over the front of the display case 12 and has a plurality of crossbars 22 generally aligned with the stops 18. The crossbars 22 have a plurality of illuminatable windows 24, which, when illuminated, draw attention to the particular column of a product. The illuminatable windows 24 may have product identification information printed thereon, or the label on the product container 16 may be relied upon to identify the product.

A control panel 26, optionally located at the top of the categorical display device 20, has a plurality of command controls 28, which may be used to command the categorical illumination of the illuminatable windows 24 to draw attention to the particular subset of products associated with the command control 28. The control panel 26 may also have an area 30 devoted to indicia explaining the operation of the device. In addition, there may be keyboard entry via a keyboard 32 for more detailed commands to the apparatus. For example, when spices of Italy are selected by the appropriate command control 28, all spices typically associated with Italian cooking would be illuminated. A proper operation of the keyboard 32 to select, for example, the recipe for chicken cacciatore, extinguishes all of the illuminatable windows 24, except for those specifically associated with chicken cacciatore.

Although the categorical display device 20 is shown in FIGS. 1 and 2 as a separate demountable assembly fitting on the face of a display case 12, it would be clear to one skilled in the art and encompassed within the scope of the invention for the categorical display device 20 to be integrally formed with the display case 12.

Figure 3:
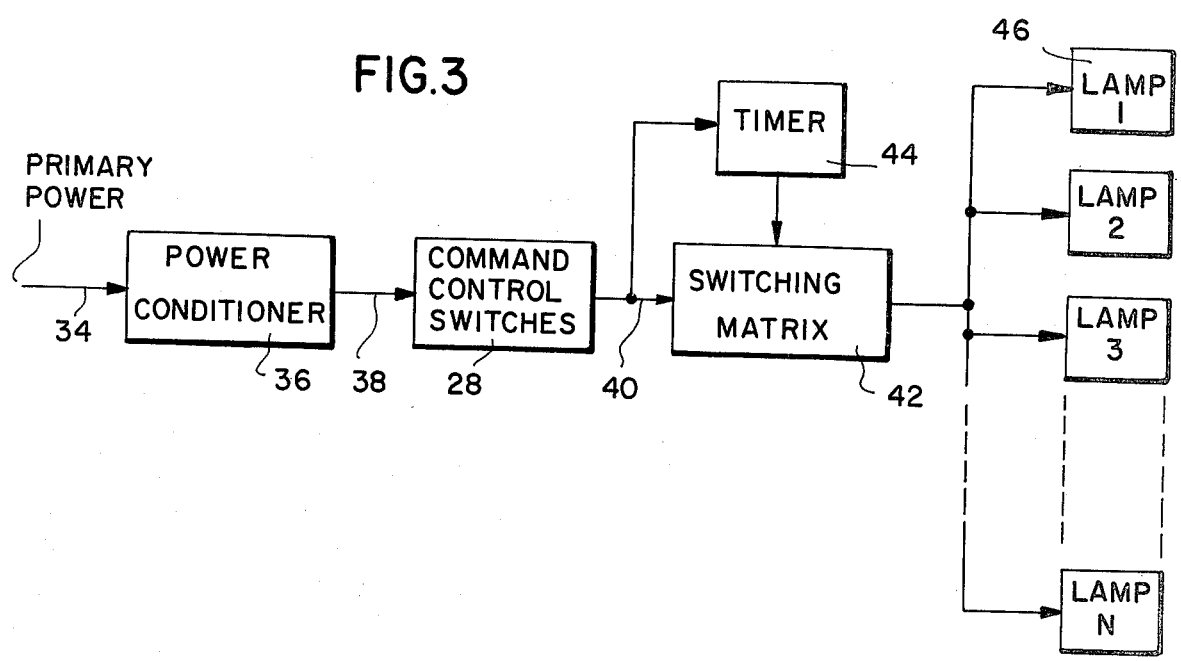
FIG. 3 shows a block diagram of the electrical control of the present invention.

Turning now to FIG. 3, there is shown a block diagram of a categorical display device according to the present invention. The primary power line 34 is connected to the power conditioner 36. Primary power is ordinarily ac voltage of 110 or 220 volts single phase and is converted by a power conditioner 36 to appropriate specifications to operate the remainder of the system. For example, if the remainder of the system is composed of solid-state logic devices, power conditioner 36 may generate one or more dc voltages for use in these circuits. Alternatively, if the remainder of the circuits depend upon alternating current relays, power conditioner 36 may need a transformer to provide the appropriate voltage for electro-mechanical relays.

The conditioned power is connected on line 38 to command control switches 28. When one of the command control switches 28 is actuated, a signal is connected via line 40 to switching matrix 42 and to timer 44. Switching matrix 42 sets up the combination of outputs commanded by command control switches 28 and connects these to indicator lamps 46 in proper combination to indicate the product associated with the particular one of the command control switches 28 which has been actuated. Timer 44 enables the energization of the indicator lamps 46 for a fixed period of time, after which it causes them to become extinguished.

Figure 4:
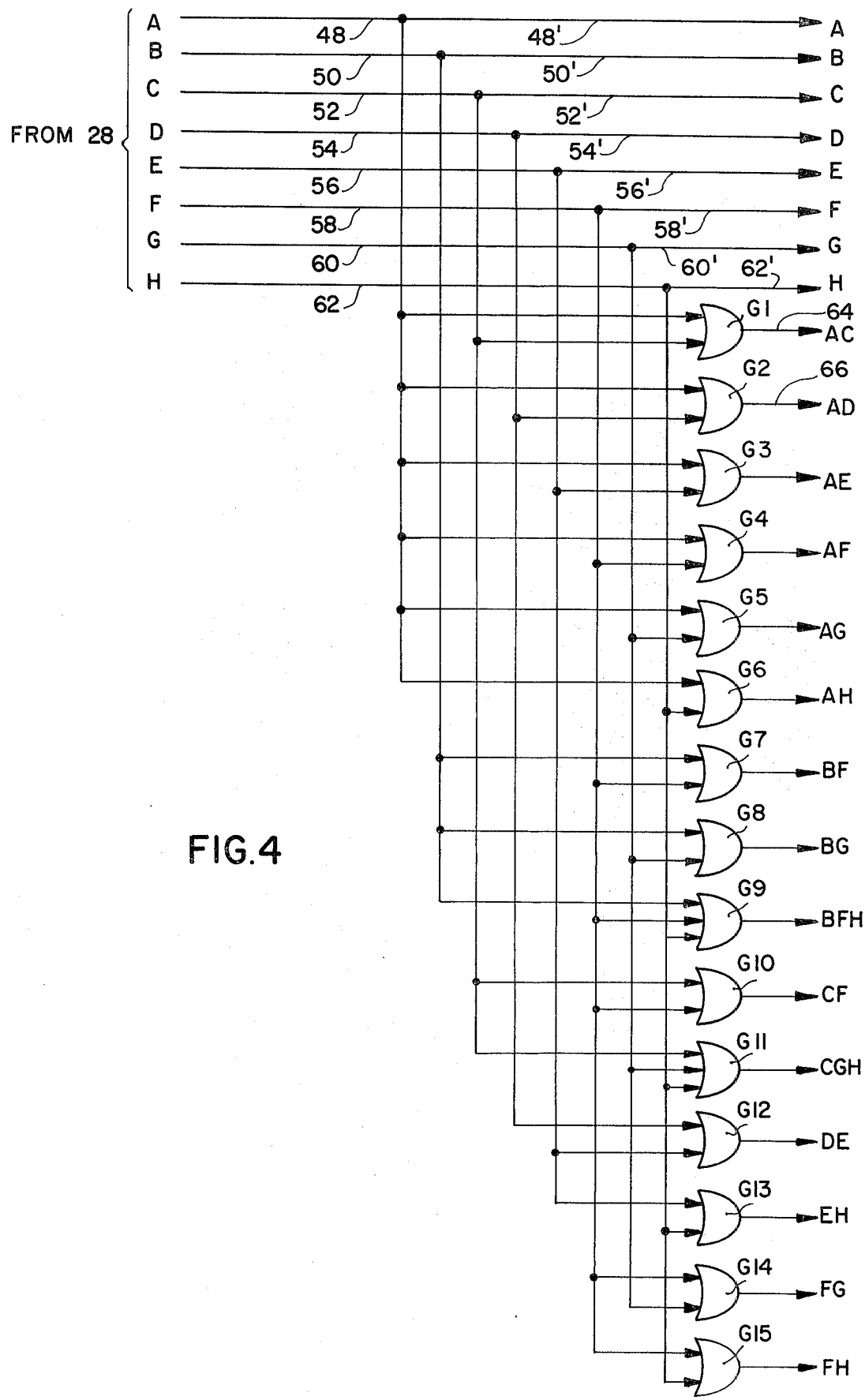
FIG. 4 shows a wired memory.

Turning now to FIG. 4, there is shown a fixed wired switching matrix 42 for control of a plurality of indicator lamps (not shown) from discrete commands generated by operation of and one of a plurality of command control switches (not shown).

For the purposes of illustration, assume that a command control has been generated by command control switch A on command line 48. This signal is carried on line 48 to all indicators which are uniquely associated with switch A and which are not affected by any other of the switches. In addition, the signal on line 48 is connected to OR gates G1 through G6. These OR gates make it possible to illuminate a particular lamp by control from more than one command switch. For example, gate G1 receives signals from switch A on 48, as well as from switch C on line 52. The output 64 on gate G1 is connected to all lamps which are illuminated optionally either by switch A or C. Similarly, OR gate G2 receives signals from switches A and D and its output 66 is connected to all lamps which are energizable by either switch A or switch D. The outputs of all other OR gates are labelled with input commands which energize them.

Figure 5:
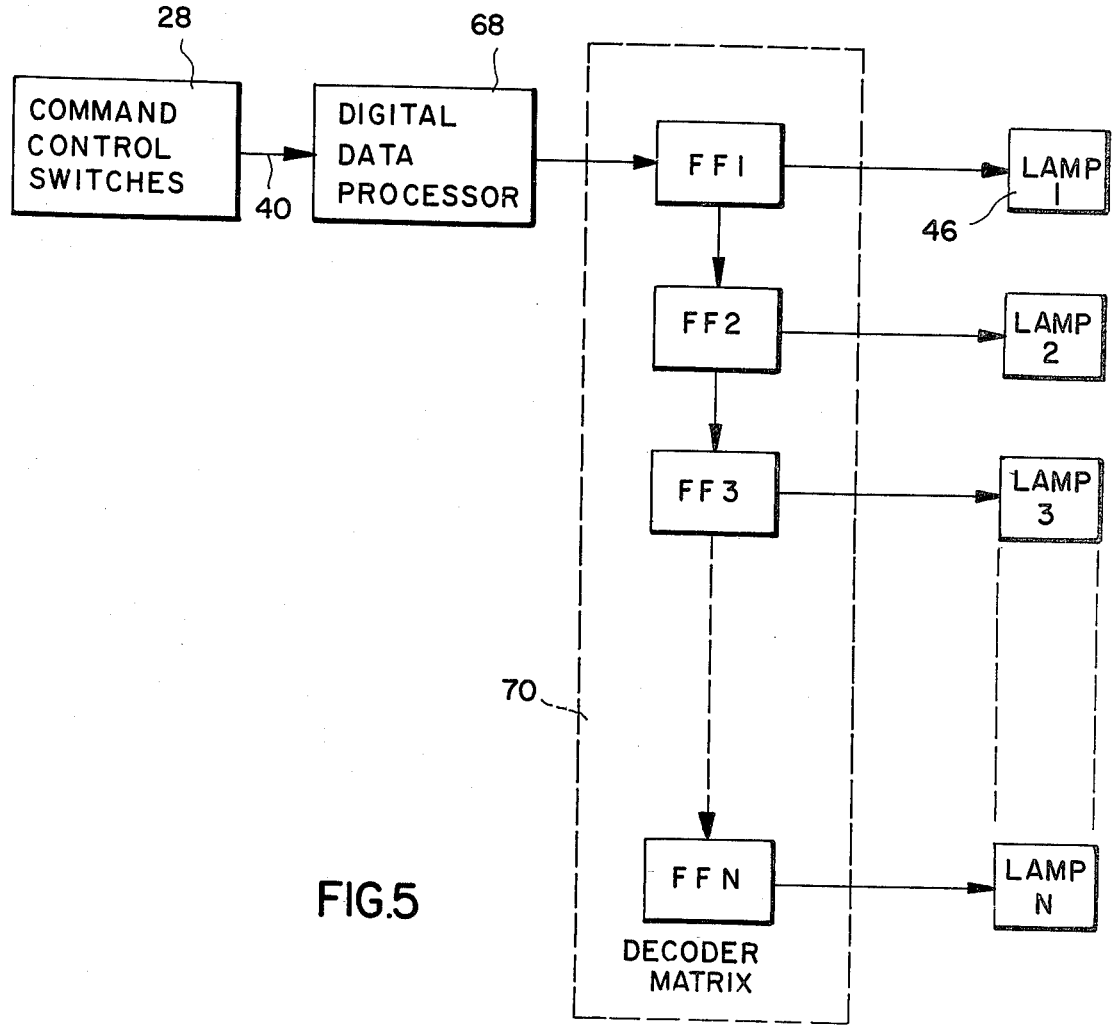
FIG. 5 shows a processor controlled embodiment of the present invention.

One skilled in the art will notice that the gate arrangement in FIG. 4 amounts to a wired memory which, upon a particular input command, always generates a particular subset of outputs. A more flexible arrangement which permits changing the relationship between command control switch actuations and the pattern of categorical indications is shown in FIG. 5. The command control switches 28 generate signals which are connected on line 40 to a digital data processor 68, preferably a microprocessor. Upon receiving the signal from the command control switches 28, the digital data processor 68 generates from a stored program a bit stream associated with the particular one of the command control switches 28 which has been actuated and connects this bit stream to a decoder matrix 70. The decoder matrix 70 consists of a plurality of flip-flops FF 1-FF 2, in one-to-one relationship with the categorical indicator lamps 46 forming a circulating register. The bit stream from digital data processor 68 is clocked in sequence through the flip-flops in the decoder matrix to establish a particular fixed pattern of ones and zeros in these flip-flops. This results in a fixed predetermined pattern of digital ones and zeros stored in the decoder matrix. If a digital one is stored in FF 1, for example, lamp 1 is illuminated. If a digital zero is stored in FF 2, for example, lamp 2 is extinguished. In this way, any combination of lamp illuminations and extinguishments can be accomplished by the pattern of the bit stream produced from the digital data processor 68.

In addition to the flexibility of the digital data processor just described, the flexibility is even further enhanced by the possibility of using a changeable memory program to update patterns of illuminations and extinguishments associated with the particular pattern of command control switches 28.

The terms and expressions which are employed are used as terms of description; it is recognized, though, that various modifications are possible.

It is also understood the following claims are intended to cover all of the generic and specific features of the invention herein described, and all statements of the scope of the invention which, as a matter of language, might fall therebetween.

Having described certain forms of the invention in some detail, what is claimed is:

1. A categorical indicator device on an article display rack, said display rack including a plurality of rows for display of articles, said articles, discretely stackable on said shelves in columns, said shelves slanted downward for gravity feed of said articles, said categorical indicator device adapted to optionally indicate at least one subset of a category matrix of articles, said indicator device comprising indicator means including members having a one-to-one physical relationship with individual members of said category matrix at said columns, storage means for storing the identity of said at least one category subset, selection means for selecting a selected subset of said at least one subset, and control means for energizing selected indicator members associated with said selected subset whereby said selected subset is distinguished from other articles.

2. The invention of claim 1 wherein said indicator means comprises illuminable electric lamps in physical relationship to said articles in said columns.

3. The apparatus of claim 1 wherein said storage means comprises a wired memory including at least one gate.

4. The apparatus of claim 1 wherein said storage means comprises a digital processor.

5. The apparatus of claim 4 wherein said digital processor is a microprocessor.

6. The apparatus of claim 1 wherein said selection means comprises a plurality of command buttons, at least one of said command buttons being effective to select said selected subset.

7. The apparatus of claim 6 wherein said control means comprises circulating register means for receiving and storing a predetermined digital pattern from said digital processor and for energizing and de-energizing specific ones of said indicator members according to said predetermined digital pattern.

8. The apparatus of claim 1 including a plurality of indicator members in a row, said storage device containing means for independently energizing at least first and second subsets of said category matrix, said first and second subsets containing at least one common member, and at least first and second command buttons operable to command energization of said first and second subset indicator members.

* * * * *